United States Patent [19]
Ota et al.

[11] Patent Number: 5,238,101
[45] Date of Patent: Aug. 24, 1993

[54] CONVEYOR FOR TRANSPORTING CONTAINERS

[75] Inventors: Shohei Ota; Haruhiko Sato; Tetsuya Iuchi; Masao Nobuta; Seiji Hashimoto, all of Tokushima, Japan

[73] Assignee: Shikoku Kakoki Co., Ltd., Itano, Japan

[21] Appl. No.: 875,805

[22] Filed: Apr. 30, 1992

[30] Foreign Application Priority Data

May 7, 1991 [JP] Japan ................. 3-30893[U]

[51] Int. Cl.$^5$ .............................. B65G 17/32
[52] U.S. Cl. .................. 198/626.5; 198/803.11
[58] Field of Search .............. 198/626.5, 803.11

[56] References Cited

U.S. PATENT DOCUMENTS

| | | | |
|---|---|---|---|
| 2,358,292 | 9/1944 | Malhiot | 198/803.11 |
| 2,639,025 | 5/1953 | Schmitt | 198/803.11 X |
| 2,722,305 | 11/1955 | McCabe | 198/626.5 X |
| 3,325,977 | 6/1967 | Kirsten | 198/626.5 X |
| 3,779,364 | 12/1973 | Kammann | 198/803.11 X |
| 3,857,474 | 12/1974 | Hutson | 198/626.5 |
| 4,502,592 | 3/1985 | Ramcke | 198/626.5 |
| 4,508,210 | 4/1985 | Ramcke et al. | 198/626.5 |
| 4,641,742 | 2/1987 | Igarashi et al. | 198/626.5 |
| 4,718,540 | 1/1988 | Greenwell | 198/803.11 X |

FOREIGN PATENT DOCUMENTS

| | | |
|---|---|---|
| 0122606 | 10/1984 | European Pat. Off. . |
| 0286514 | 10/1988 | European Pat. Off. . |
| 0235205 | 9/1988 | Japan .................. 198/626.5 |

*Primary Examiner*—D. Glenn Dayoan
*Attorney, Agent, or Firm*—Armstrong, Westerman, Hattori, McLeland & Naughton

[57] ABSTRACT

A container transport conveyor having a plurality of holder plates each including a first segment and a second segment, the first and second segments being arranged side by side in the direction of transport by the conveyor for holding containers therebetween, a pair of first endless chains having the first segments connected therebetween, a pair of second endless chains having the second segments connected therebetween, a pair of first drive sprockets having the respective first endless chains reeved therearound, a pair of second drive sprockets having the respective second endless chains reeved therearound, and means for varying the phase difference between each of the first drive sprockets and each of the second drive sprockets.

19 Claims, 4 Drawing Sheets

CONVEYOR FOR TRANSPORTING CONTAINERS

BACKGROUND OF THE INVENTION

The present invention relates to container transport conveyors for use in packaging machines for filling cup-shaped containers with dessert foods such as custard puddings, jellys, yogurts or ice creams.

Such conveyors heretofore known comprise a plurality of holder plates connected between a pair of endless belts and formed with container holding apertures.

The container holding apertures are formed in the holder plates in conformity with the size and shape of the containers to be transported by the conveyor. Accordingly, when containers which are different in size or shape from those previously handled are to be transported by the conveyor, the holder plates need to be replaced by those formed with holding apertures in conformity with the containers to be transported, hence a cumbersome procedure.

SUMMARY OF THE INVENTION

The main object of the present invention is to provide a container transport conveyor which is adapted to transport different kinds of containers having varying sizes or shapes without the necessity of changing the holder plates.

The present invention provides, a container transport conveyor which comprises a plurality of holder plates each comprising a first segment and a second segment, the first and second segments being arranged side by side in the direction of transport by the conveyor for holding containers therebetween, a pair of first endless chains having the first segments connected therebetween, a pair of second endless chains having the second segments connected therebetween, a pair of first drive sprockets having the respective first endless chains reeved therearound, a pair of second drive sprockets having the respective second endless chains reeved therearound, and means for varying the phase difference between each of the first drive sprockets and each of the second drive sprockets.

With the container transport conveyor of the present invention, each of the first endless chains and each of the second endless chains are displaced from each other when the phase difference between the first drive sprocket and the second drive sprocket is altered, whereby the distance between the first segment and the second segment is altered by the amount of displacement.

According to the invention, therefore, different kinds of containers which vary in size or shape can be transported without changing the holder plates.

DESCRIPTION OF THE PREFERRED EMBODIMENT

An embodiment of the invention will be described below with reference to the accompanying drawings.

In the following description, the terms "front" and "rear" will be used with respect to the direction of travel of the holder plates of the conveyor to be described; the direction in which the holder plates advance (indicated by an arrow in FIG. 1) will be referred to as "front," and the opposite direction as "rear." The terms "right" and "left" will be used for the convenyor as seen from the rear forward.

Figure 1:
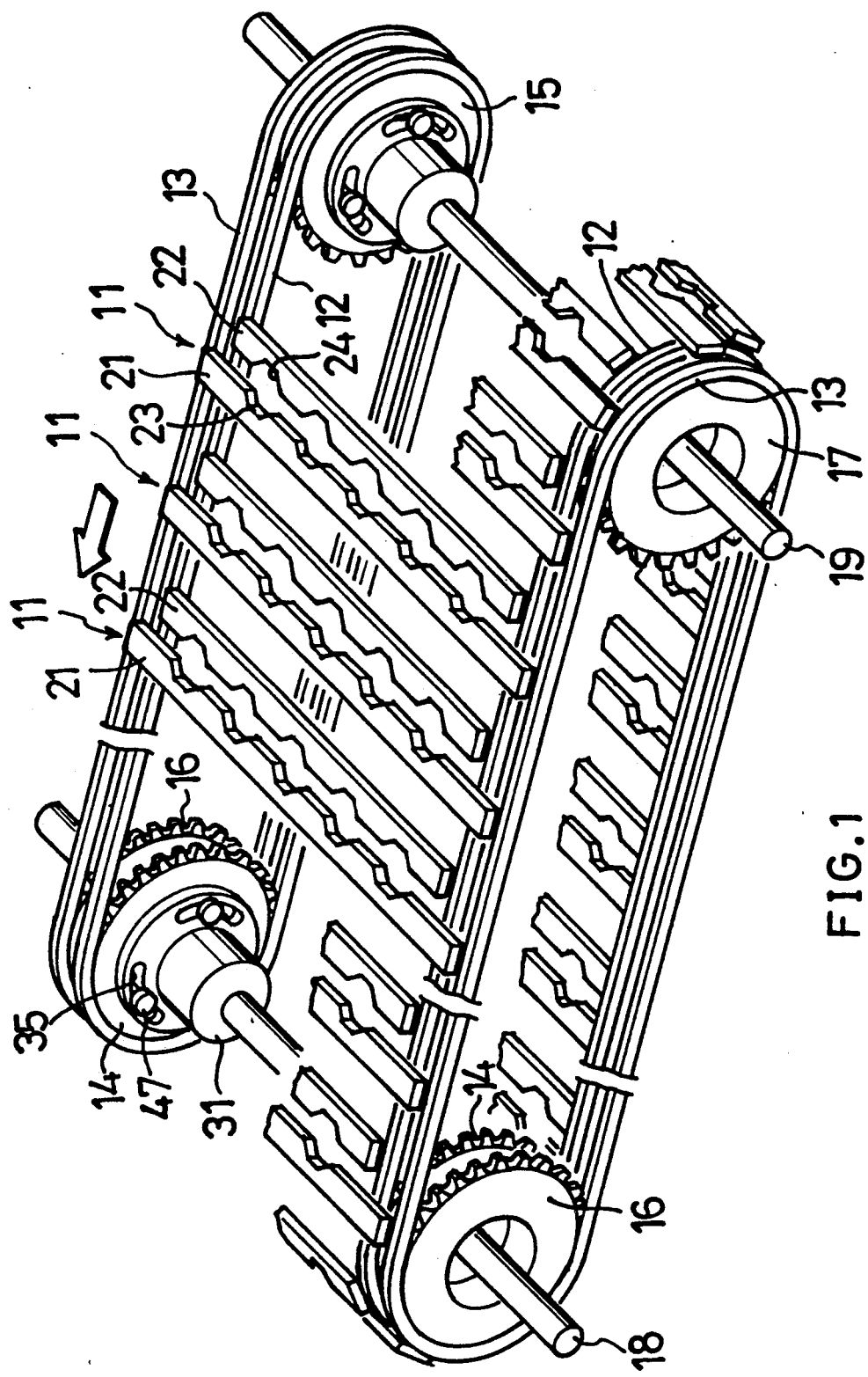
FIG. 1 is a perspective view of a container transport conveyor embodying the invention.

Referring to FIG. 1, the illustrated container transport conveyor comprises a plurality of holder plates 11, a pair of right and left first endless chains 12, a pair of right and left second endless chains 13 arranged outside the respective first endless chains 12 in parallel thereto, a front first drive sprocket 14 and a rear first driven sprocket 15 which are disposed at each side of a path of transport by the conveyor and which have the first endless chain 12 reeved therearound, a front second drive sprocket 16 and a rear second driven sprocket 17 which are disposed at each side of the path and which have the second endless chain 13 reeved therearound, a drive shaft 18 having the pair of first drive sprockets 14 and the pair of second drive sprockets 16 mounted thereon, and a driven shaft 19 having the pair of first driven sprockets 15 and the pair of second driven sprockets 17 mounted thereon.

Figure 2:
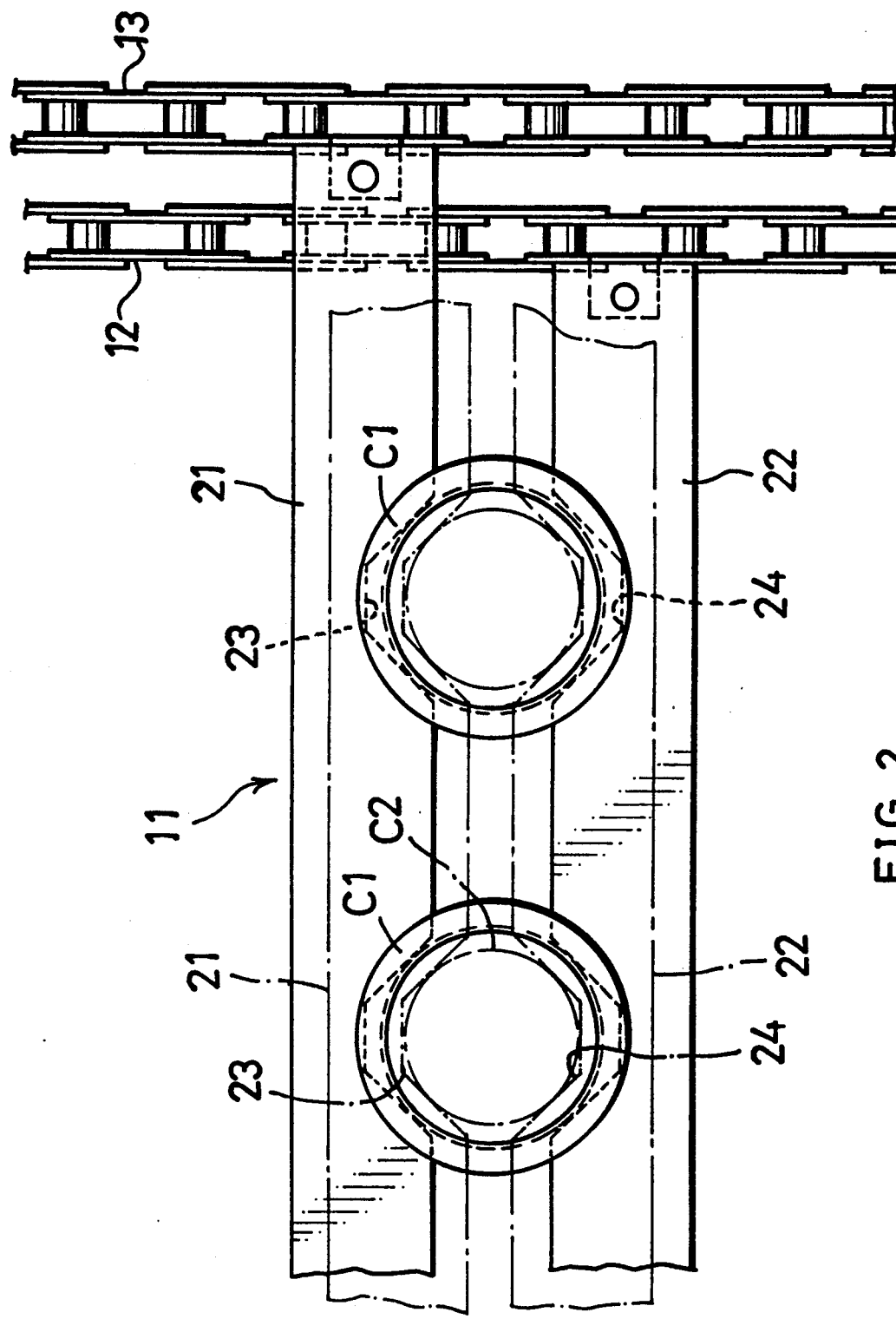
FIG. 2 is a fragmentary plan view of the conveyor.

Each of the holder plates 11 is divided in two in the form of a pair of front and rear segments 21, 22 arranged side by side in the direction of transport. Each of the front and rear segments 21, 22 of the holder plate 11 is in the form of a horizontal plate elongated transversely of the transport direction. The front segment 21 is longer than the rear segment 22. The front segment 21 is connected between the pair of second endless chains 13, and the rear segment 22 between the pair of first endless chains 12. The opposed edge portions of the front and rear segments 21, 22 in each pair are formed respectively with opposed engaging recesses 23, 24 for holding containers. As shown in FIG. 2, the engaging recesses 23, 24 of the front and rear segments 21, 22 are each trapezoidal when seen from above. A plurality of recesses 23 or 24 are formed in each of the segments 21, 22. The engaging recesses 23 of the front segment 21 face rearward, while the recesses 24 of the rear segment 22 face forward.

Figure 3:
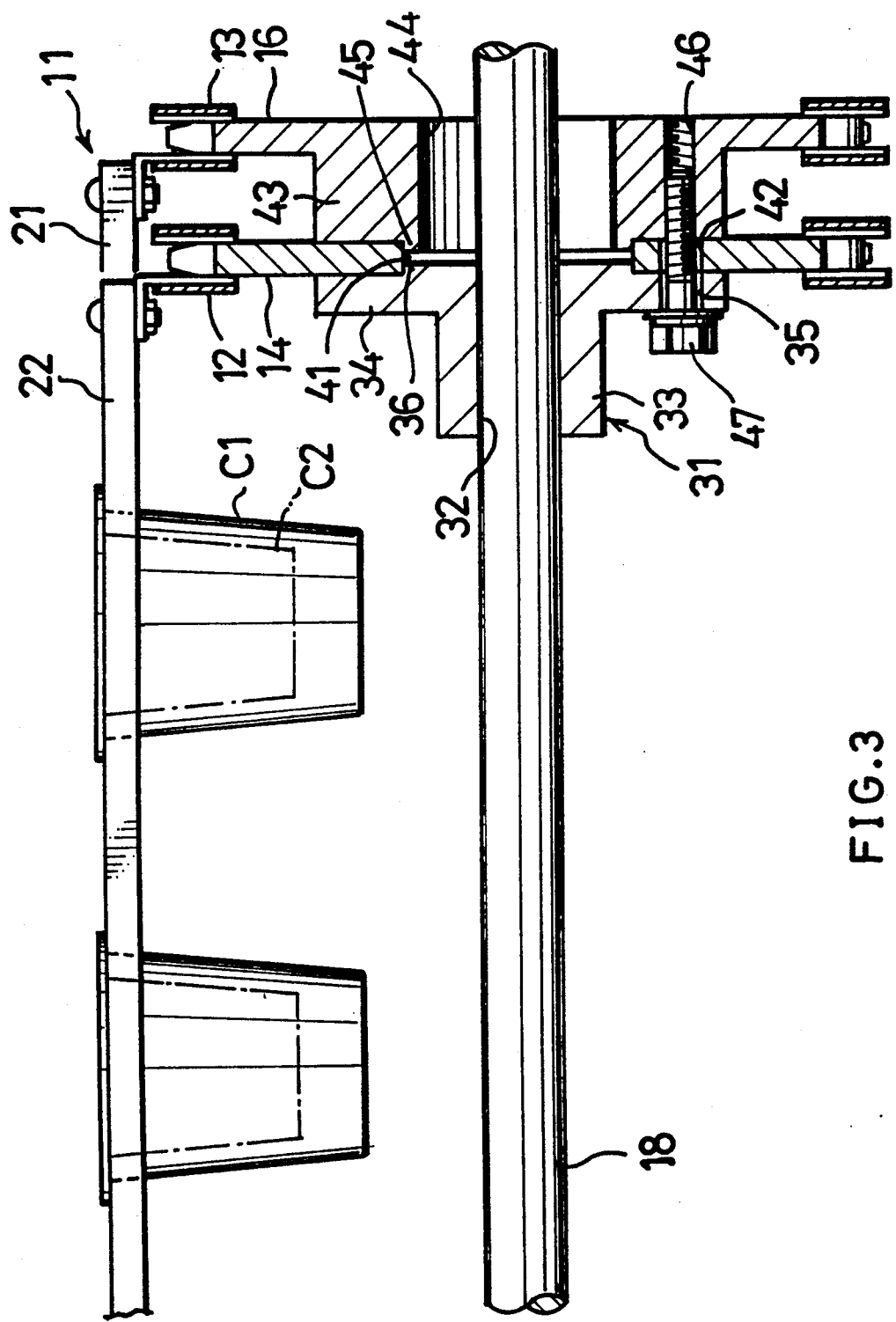
FIG. 3 is a view in vertical cross section of the conveyor.
Figure 4:
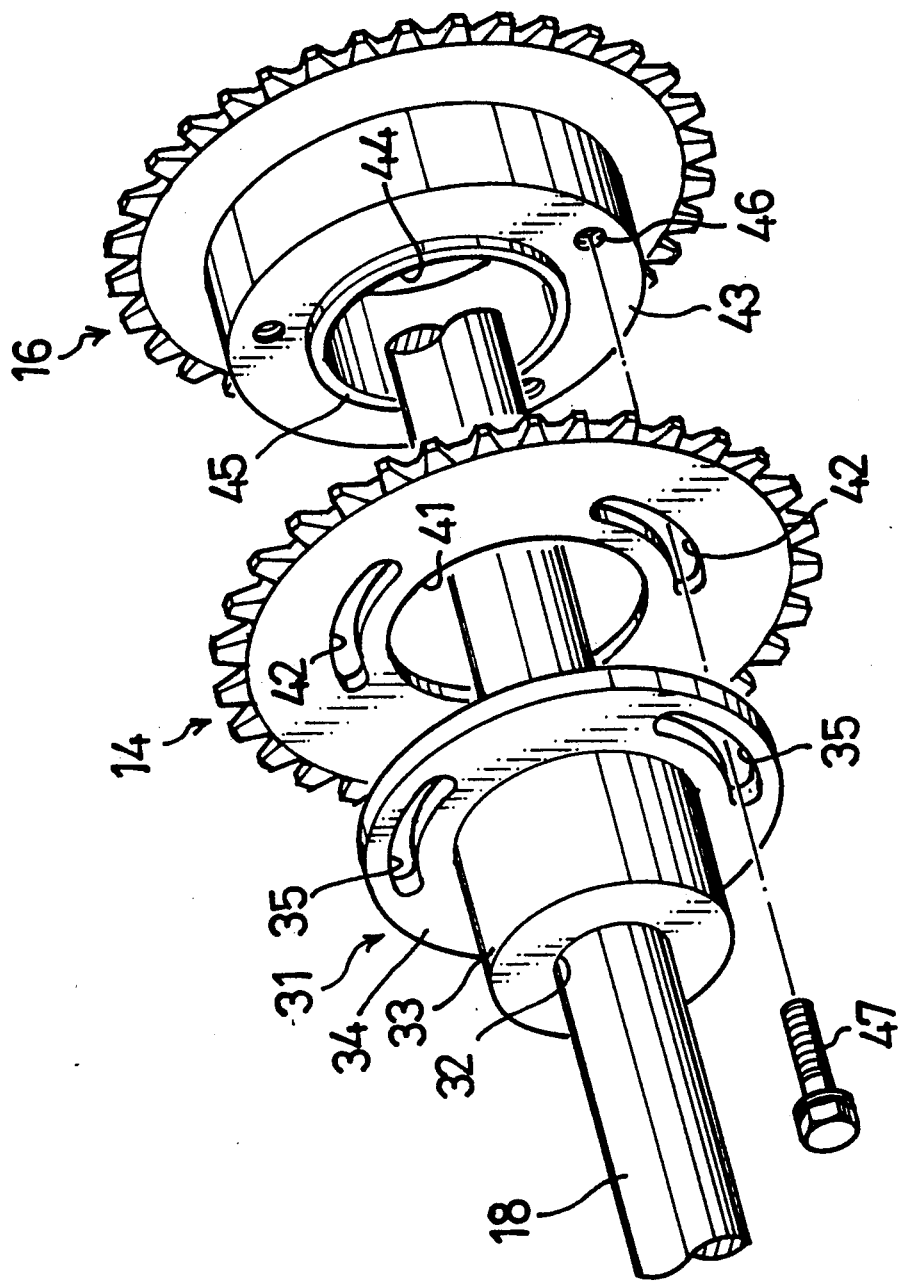
FIG. 4 is an exploded perspective view of an assembly including a first drive sprocket and a second drive sprocket.

FIGS. 3 and 4 show a structure for mounting the first and second drive sprockets 14, 16 at the right side on the drive shaft 18. This structure is identical with a structure for mounting the left first and second drive sprockets 14, 16 on the drive shaft 18 and with structures for mounting the first and second driven sprockets 15, 17 at the right and left sides on the driven shaft 19, so that the structures not shown in FIGS. 3 and 4 will not be described.

A mount sleeve 31 is provided between the drive shaft 18 and the first and second drive sprockets 14, 16. The mount sleeve 31 is keyed to the drive shaft 18 nonrotatably relative to the shaft but movably axially thereof, and comprises a boss 33 having, the shaft 18 extending through a center bore 32 therein, and a flange 34 provided at the right end of the boss. The flange 34 has three inner slots 35 equidistantly spaced apart and formed on a circumference centered about the axis of the center bore 32. A projection 36 is formed on the right side face of the flange 34.

The first drive sprocket 14 is in the form of an annular plate having a center hole 41 with the projection 36 fitted therein. The first drive sprocket 14 is formed with outer slots 42 in register with the respective inner slots 35.

The second drive sprocket 16 comprises an annular plate having substantially the same shape as the first drive sprocket 14, and an annular thick spacer 43 provided on the left side of the annular plate and integral therewith. The sprocket 16 has a center bore 44 with the drive shaft 18 inserted therethrough. Provided on the left side face of the spacer 43 is a ridge 45 fitted in the center hole 41. The second drive sprocket 16 has three threaded bores 46 axially extending therethrough and corresponding to the slots 35, 42.

With the first drive sprocket 14 held between the mount sleeve 31 and the second drive sprocket 16, bolts 47 are inserted through the inner slots 35 and the outer slots 42 and screwed into the respective threaded bores 46 The fastening force of the bolts 47 causes the mount sleeve 31 to lock the first and second drive sprockets 14, 16 to the drive shaft 18 by virtue of the friction between the mount sleeve 31, the first drive sprocket 14 and the second drive sprocket 16.

When the phase difference between, the first drive sprocket 14 and the second drive sprocket 16 is altered after loosening the bolts 47, the distance between the front and rear segments 21, 22 of each holder plate 11 varies as indicated in solid lines and broken lines in FIG. 2 although the center line of the holder plate remains unshifted With the front and rear segments 21, 22 spaced apart by a large distance as indicated in the solid lines, large containers Cl are held in the respective pairs of opposed engaging recesses 23, 24 of the front and rear segments 21, 22. When the distance between the front and rear segments 21, 22 is small as indicated in the broken lines, small containers C2 are held in the respective pairs of opposed engaging recesses 23, 24 of the segments 21, 22.

What is claimed is:

1. A container transport conveyor comprising:
 a plurality of holder plates each comprising a first segment and a second segment, the first and second segments being arranged side by side in the direction of transport by the conveyor for holding containers therebetween,
 a pair of first endless chains having the first segments connected therebetween,
 a pair of second endless chains having the second segments connected therebetween,
 a pair of first drive sprockets having the respective first endless chains reeved therearound,
 a pair of second drive sprockets having the respective second endless chains reeved therearound, and
 means for varying the phase difference between each of the first drive sprockets and each of the second drive sprockets, wherein each second drive sprocket comprises an annular spacer integral therewith for spacing each second drive sprocket form the respective first drive sprocket.

2. A container transport conveyor comprising:
 a plurality of holder plates each comprising a first segment and a second segment, the first and second segments being arranged side by side in the direction of transport by the conveyor,
 a pair of first endless chains having the first segments connected therebetween,
 a pair of second endless chains having the second segments connected therebetween,
 a pair of first drive sprockets having the respective first endless chains reeved therearound,
 a pair of second drive sprockets having the respective second endless chains reeved therearound, and
 means for mounting the pair of first drive sprockets and the pair of second drive sprockets on a drive shaft, a first and second drive sprocket disposed at each end of the drive shaft with the phase difference between the pairs of drive sprockets made variable, wherein the mounting means comprises a pair of mount sleeves fitted around the drive shaft and rotatable therewith, and the first drive sprocket and the second drive sprocket at each end of the drive shaft are attached to the respective mount sleeve rotatably relative thereto, each first drive sprocket disposed between the respective second drive sprocket and mount sleeve.

3. A container transport conveyor as defined in claim 2 wherein the first drive sprocket, the second drive sprocket, and the mount sleeve are annular members, and
 wherein said annular members are arranged side by side with bolts extending through two of the three annular members when fitted together side by side, and said bolts being screwed into the third annular member, said two of the three annular members being formed with slots for the respective bolts to extend therethrough.

4. A container transport conveyor as defined in claim 1 or 2 wherein the first segment and the second segment of each holder plate are formed in opposed edge portions thereof with opposed container engaging recesses respectively.

5. A container transport conveyor as defined in claim 1, wherein said annular spacer of each second drive sprocket has a diameter less than a second drive sprocket portion around which the respective second endless chains are reeved.

6. A container transport conveyor as defined in claim 5, wherein said annular spacer of each second drive sprocket comprises an axially projecting ridge for fitting within a central hole in the respective first drive sprocket.

7. A container transport conveyor as defined in claim 6, wherein said means for varying the phase difference comprises a pair of mount sleeves fitted around the drive shaft and rotatable therewith, each mount sleeve having at least one circumferentially extending slot.

8. A container transport conveyor as defined in claim 7, wherein each mount sleeve comprises a boos having the drive shaft extending through a center bore therein, an a flange radially extending from said boss and drive shaft.

9. A container transport conveyor as defined in claim 8, wherein said flange of each mount sleeve comprises an axially extending projection for fitting within said central hole of the respective first drive sprocket from a side opposite to a side from which said second drive sprocket annular space projecting ridge projects into said central hole.

10. A container transport conveyor as defined in claim 1, wherein each annular spacer integral with a second drive sprocket comprises at least one threaded bore hole for accepting an end of a bolt therein.

11. A container transport conveyor as defined in claim 2, wherein each mount sleeve comprises a boss having the drive shaft extending through a center bore therein, and a flange radially extending from said boss and drive shaft.

12. A container transport conveyor as defined in claim 11, wherein said flange of each mount sleeve comprises an axially extending projection for fitting within a central hole of a respective first drive sprocket.

13. A container transport conveyor as defined in claim 11, wherein at least one circumferentially extending slot is formed in the flange of each mount sleeve.

14. A container transport conveyor as defined in claim 13, wherein each first drive sprocket comprises at least one circumferentially extending slot corresponding to said at least one circumferentially extending slot of the respective mount sleeve flange.

15. A container transport conveyor as defined in claim 12, wherein each second drive sprocket comprises an annular spacer integral therewith for spacing each second drive sprocket form the respective first drive sprocket.

16. A container transport conveyor as defined in claim 15, wherein said annular spacer of each second drive sprocket has a diameter less than a second drive sprocket portion around which the respective second endless chains are reeved.

17. A container transport conveyor as defined in claim 16, wherein said annular spacer of each second drive sprocket comprises an axially projecting ridge for fitting within a central hole in the respective first drive sprocket.

18. A container transport conveyor as defined in claim 7, wherein each mount sleeve is keyed to the drive shaft nonrotatably and axially movable relative to the drive shaft.

19. A container transport conveyor as defined in claim 2, wherein each mount sleeve is keyed to the drive shaft nonrotatably and axially movable relative to the drive shaft.

* * * * *